US012748304B2

(12) United States Patent
Lottes et al.

(10) Patent No.: US 12,748,304 B2
(45) Date of Patent: Sep. 29, 2026

(54) VEHICLE WINDSHIELD VIRTUAL IMAGE DISPLAY SYSTEM AND AN OPERATING SYSTEM FOR SAME

(71) Applicant: AUDI AG, Ingolstadt (DE)

(72) Inventors: Daniel Lottes, Ihrletstein (DE); Philipp Weiss, Duesseldorf (DE); Annegret Matthai, Rohrbach (DE)

(73) Assignee: AUDI AG, Ingolstadt (DE)

( * ) Notice: Subject to any disclaimer, the term of this patent is extended or adjusted under 35 U.S.C. 154(b) by 998 days.

(21) Appl. No.: 17/780,341

(22) PCT Filed: Dec. 4, 2020

(86) PCT No.: PCT/EP2020/084574

§ 371 (c)(1),
(2) Date: May 26, 2022

(87) PCT Pub. No.: WO2021/110889

PCT Pub. Date: Jun. 10, 2021

(65) Prior Publication Data

US 2022/0413288 A1 Dec. 29, 2022

(30) Foreign Application Priority Data

Dec. 6, 2019 (DE) ..................... 10 2019 133 295.8

(51) Int. Cl.
*G02B 27/01* (2006.01)
*B60K 35/10* (2024.01)
(Continued)

(52) U.S. Cl.
CPC .......... *G02B 27/0101* (2013.01); *B60K 35/10* (2024.01); *B60K 35/23* (2024.01);
(Continued)

(58) Field of Classification Search
CPC .. B60K 35/23; B60K 2360/785; B60K 37/20; B60K 35/00; B60K 2360/23
See application file for complete search history.

(56) References Cited

U.S. PATENT DOCUMENTS 8,049,609 B2 11/2011 Takahashi et al.
2008/0186156 A1 8/2008 Uematsu et al.
(Continued)

FOREIGN PATENT DOCUMENTS

DE 10 2009 010 614 A1 10/2009
DE 10 2009 020 824 A1 4/2010
(Continued)

OTHER PUBLICATIONS

European Intention to Grant issued in counterpart European Application No. 20 820 376.0 dated Mar. 19, 2024.
(Continued)

*Primary Examiner* — Lauren Nguyen
(74) *Attorney, Agent, or Firm* — STAAS & HALSEY LLP

(57) ABSTRACT

A motor vehicle includes a display system having an image source positioned in a dashboard of the motor vehicle for emitting light beams. A reflection region extends in parallel to a lateral edge of a pane layer of a windshield of the motor vehicle. The reflection region is configured to reflect the light beams to generate a virtual image and the image source includes a one-dimensional switchable strip display. A controller of the motor vehicle is configured to provide, by using the one-dimensional switchable strip display corresponding to the virtual image, at least one of a dynamic running light and a static light strip.

20 Claims, 3 Drawing Sheets

(51) Int. Cl.

| | |
|---|---|
| ***B60K 35/23*** | (2024.01) |
| ***B60K 35/60*** | (2024.01) |
| ***B60K 35/80*** | (2024.01) |
| ***B60K 37/20*** | (2024.01) |
| ***B60R 1/12*** | (2006.01) |

(52) U.S. Cl.
CPC .............. *B60K 35/60* (2024.01); *B60K 35/80* (2024.01); *B60K 37/20* (2024.01); *B60R 1/12* (2013.01); *G02B 27/0179* (2013.01); *B60R 2001/1215* (2013.01); *G02B 2027/0118* (2013.01); *G02B 2027/0181* (2013.01)

(56) References Cited

U.S. PATENT DOCUMENTS

| | | | | |
|---|---|---|---|---|
| 2009/0231116 | A1* | 9/2009 | Takahashi | G02B 27/01 340/461 |
| 2010/0066925 | A1 | 3/2010 | Nagahara et al. | |
| 2014/0355106 | A1 | 12/2014 | Laluet et al. | |

FOREIGN PATENT DOCUMENTS

| | | | | |
|---|---|---|---|---|
| DE | 102013014446 | A1 | 8/2013 | |
| DE | 10 2013 003 686 | A1 | 9/2013 | |
| DE | 11 2015 001 200 | T5 | 8/2016 | |
| DE | 10 2015 016 281 | A1 | 6/2017 | |
| DE | 10 2017 112 593 | A1 | 12/2017 | |
| DE | 102019133295.8 | | 12/2019 | |
| EP | 2174833 | A2 | 4/2010 | |
| EP | 3-549806 | * | 9/2019 | B60K 35/00 |
| EP | 3549806 | A1 | 10/2019 | |
| EP | 3 549 806 | B1 | 9/2020 | |
| FR | 3056773 | | 9/2016 | |
| JP | 2007-86226 | * | 4/2007 | G02B 27/02 |
| WO | WO-03-015424 | * | 2/2003 | G02B 27/22 |
| WO | WO 2009/122094 | A1 | 10/2009 | |
| WO | WO-2015-182664 | * | 12/2015 | B60K 35/00 |
| WO | WO 2017/103426 | A1 | 6/2017 | |
| WO | PCT/EP2020/084574 | | 12/2020 | |

OTHER PUBLICATIONS

European Text Intended to Grant from counterpart European Application No. 20 820 376.0.

Notification of Transmittal of Translation of the International Preliminary Report on Patentability (Form PCT/IB/338); mailed Jun. 16, 2022 in corresponding PCT Application No. PCT/EP2020/084574 (1 page.).

International Preliminary Report on Patentability (Form PCT/IB/373); mailed May 17, 2022 in corresponding PCT Application No. PCT/EP2020/084574 (1 page.).

Written Opinion (Form PCT/ISA/237); mailed Feb. 12, 2021 in corresponding PCT Application No. PCT/EP2020/084574 (9 pages) (8 pages English Translation).

International Search Report (Form PCT/ISA/210); mailed Feb. 4, 2021 in corresponding PCT Application No. PCT/EP2020/084574 (5 pages) (4 pages English Translation).

Written Opinion (Form PCT/ISA/237); mailed Feb. 4, 2021 in corresponding PCT Application No. PCT/EP2020/084574 (9 pages).

German Examination Report dated Sep. 10, 2020 in corresponding German Patent Application No. 10 2019 133 295.8 (3 pages).

* cited by examiner

VEHICLE WINDSHIELD VIRTUAL IMAGE DISPLAY SYSTEM AND AN OPERATING SYSTEM FOR SAME

CROSS REFERENCE TO RELATED APPLICATIONS

This application is a U.S. national stage of International Application No. PCT/EP2020/084574, filed on Dec. 4, 2020. The International Application claims the priority benefit of German Application No. 10 2019 133 295.8 filed on Dec. 6, 2019. Both International Application PCT/EP2020/084574 and German Application 10 2019 133 295.8 are incorporated by reference herein in their entirety.

BACKGROUND

Described herein are a motor vehicle having a display system. Furthermore, described herein is a method for operating such a motor vehicle.

It can be of interest for an occupant of a motor vehicle, for example a driver of the motor vehicle, to have an item of vehicle-relevant information displayed during a journey with the motor vehicle. On the basis of the displayed vehicle-relevant information, for example, an attempt to establish a connection to communicate with a person outside the motor vehicle, an acceleration process to reach a set target velocity, an intended steering process selected by use of actuating a turn signal, or a state of charge of a mobile terminal coupled to the motor vehicle can be visually output by use of optical signals to the occupant. In this context, the optical signals can be used to generate a real and/or virtual image in front of a black background, for example, in the region of a screen print.

For this purpose, German Patent Application No. 10 2009 020 824 A1 describes a virtual image system for multilayered windshields, which reflects an image source on the windshield. For this purpose, the image source can generate, by means of light, which are reflected on the windshield in such a way that a virtual image is visible to the driver, apparently behind the windshield. The virtual image can have a form of a laterally arranged large number of display units located adjacent to one another, wherein each display unit transmits an item of information to the driver with respect to respective selected states of the motor vehicle.

It is disadvantageous in such a virtual image system that a large number of display units are to be provided to generate a large-area virtual display.

Alternatively, a composite glass pane of a conductor film or conductor plate arranged between two panes can be implemented as a display. For example, German Patent Application No. 10 2013 003 686 A1 and German Patent Application No. 10 2015 016 281 A1 describe such a design.

Furthermore, a display can be provided by means of illuminants, which can be arranged between panes of a laminated windshield and can emit light upon a corresponding excitation. Such designs are found, for example, in WIPO Patent Application Publication WO 2009/122094 A1, WIPO Patent Application Publication WO 2017/103426 A1, and U.S. Patent Application Publication No. 2014/355106 A1.

It is disadvantageous in such displays integrated in the windshield that a replacement of the display and/or the windshield itself is linked to a high level of technical effort and high costs.

SUMMARY

Described herein is a solution by which a virtual image can be provided in a motor vehicle.

The virtual image provided in the motor vehicle may be achieved according to the examples described herein. Advantageous refinements of the disclosure are described in the following description, drawings, and the claims.

One or more aspects of the disclosure are based on the finding that a windshield of a motor vehicle itself and components of the motor vehicle arranged at the windshield, such as panels of a dashboard, can be used as a display surface of a display system for an occupant of the motor vehicle. For this purpose, at least one image source can emit, i.e., send out, light beams, which can be reflected in a reflection region to generate a virtual image. To be able to implement a particularly high contrast of the virtual image, an opaque background, for example a black background, for example, in the region of a so-called black print of the windshield, can be used as the reflection region. In such a display, costs for providing and maintaining the display system can be predetermined by both the at least one image source and also the reflection region. Therefore, for example, a deliberate use of the at least one image source can be sufficient to display vehicle-relevant information selectively with sufficient information content, but nonetheless permit a view of a driver of current traffic events.

A motor vehicle having a display system is described herein. The motor vehicle described herein is for example designed as an automobile, for example as a passenger vehicle or truck, or as a passenger bus or motorcycle. For this purpose, the motor vehicle includes a windshield having at least one pane layer. For example, it is the windshield manufactured from composite glass which includes multiple pane layers which are connected to one another by use of a lamination method. The at least one pane layer can be formed transparent in a middle region, so that in an installed position of the windshield in the motor vehicle, a view of the traffic events is possible for an occupant. In an edge region of the at least one pane layer, a screen printed edge (black print) can be applied, which protects a UV-sensitive adhesive bond from premature aging. Furthermore, the motor vehicle has at least one image source positioned in a dashboard of the motor vehicle, which is configured to emit light beams. For this purpose, the at least one light source can be positioned in the dashboard and emit light beams. The dashboard can be a display panel or instrument panel having measurement indicators (for example for a speedometer and/or a tachometer, monitoring lights for a turn signal) and operating levers (for example of the turn signal and high beams) of the motor vehicle. The at least one image source can be designed as an electrical illuminant, wherein it can be, for example, an LED illuminant (light-emitting diode) based on semiconductors. The emitted light beams are reflected by use of a reflection region to generate a virtual image. This means that the light beams are reflected at a reflective surface of the reflection region and generate the virtual image. The virtual image appears to float in space here and is decoupled from the position of the reflection region.

The reflection region extends in parallel to a lateral edge of the at least one pane layer, which is arranged on the dashboard in the installed position of the windshield in the motor vehicle. In other words, the reflection region is arranged in a root region of the windshield, wherein the root region is predetermined by respective roots of respective A pillars of the motor vehicle. The lateral edge of the at least one pane layer and a boundary edge of the reflection region, which is arranged opposite to the lateral edge, form two straight lines here, which lie in one plane and do not intersect one another. According to examples described herein, the reflection region is arranged along at least one lateral region of the at least one pane layer on at least one pane surface. In other words, the reflection region is positioned at the lateral region of the at least one pane layer so that at least three lateral edges of the pane layer enclose it, that is to say delimit a reflection region. The advantage results in this way that the reflection region can be automatically provided by use of the installed windshield. Alternatively or additionally, the reflection region is provided according to examples described herein along at least one component separate from the at least one pane layer on a windshield frame. In other words, the at least one separate component includes the reflection region, wherein the at least one component is arranged differently in relation to the windshield and on the windshield frame. For example, it is a veneer placed on the dashboard. The advantage results in this way that in the event of a replacement, the windshield can be implemented independently of the display system. Therefore, for example, a known windshield can be installed which does not have specific reflection properties.

Furthermore, it is provided according to examples described herein that the at least one image source provides at least one exclusively one-dimensionally switchable strip display. In other words, the at least one image source is implemented as the at least one strip display, which is configured to display a visual line. For example, the at least one strip display can be an LED strip, wherein, for example, surface mounted device light-emitting diodes (SMD LEDs) can be arranged on a flexible circuit board. This thus involves individual light sources concatenated in a chain, which jointly form the at least one strip display. Since in this case this is a technically simple and extremely robust display which can be implemented over a large length section, it can be provided particularly cost-effectively and replaced if needed. A complex representation can thus already be implemented particularly easily by use of a small number of image sources, that is to say the at least one image source, by use of the at least one strip display. In this case, the at least one strip display is positioned in parallel to a lateral edge of the at least one pane layer predetermined by a radius of curvature and alternatively or additionally of the at least one component. In other words, a radius of curvature is defined by the lateral edge of the at least one pane layer and/or the at least one component, wherein a radius of curvature of the at least one strip display corresponds thereto, so that a course of the at least one strip display and a course of the lateral edge of the at least one pane layer and/or the at least one component lie in one plane and do not intersect one another.

In addition, it is provided according to examples described herein that the virtual image is provided by use of a control device of the motor vehicle. For this purpose, the at least one strip display is selectively activated by the control device. A dynamic running light for generating an animation effect is provided by use of the at least one strip display as the virtual image. In other words, the at least one strip display is activated in such a way that the dynamic running light results as the virtual image. For this purpose, respective following light sources of the at least one strip display can be activated in at least one direction to generate an impression that the virtual image moves in the at least one direction. The advantage results in this way that, by use of the dynamic running light, a particularly high level of attentiveness can be created in the occupant and the occupant can thus be made aware of a critical situation particularly efficiently. Alternatively or additionally, the static light strip can be output as the virtual image. The generated virtual image is thus a linear light strip. The advantage results in this way that a line shape bundles a view of the occupant and as a design element creates an impression of an interior of the motor vehicle. A setting process, a performed setting of a control parameter, and/or a remaining ratio of a storage capacity to a total storage capacity is displayed here by use of the dynamic running light and alternatively or additionally the static light strip. In other words, on the basis of the virtual image, the setting process, for example, an attempt to establish a connection of a mobile terminal to establish a communication connection to a person outside the motor vehicle or an acceleration process to reach a set target velocity, is optically emulated. Alternatively or additionally, the set control parameter is output on the basis of the virtual image, for example, an intended steering process announced by actuation of a turn signal or its use as a flashing hazard light. Alternatively or additionally, a capacity ratio is also displayed as the virtual image, wherein, for example, a current state of charge, that is to say the storage capacity in relation to the total storage capacity, of the mobile terminal coupled to the motor vehicle can be displayed or an operating material indication (for example a fuel display or an oil level display) can be implemented. Furthermore, it is advantageous that the virtual image can be recognizable for each vehicle occupant from a respective seat position in a vehicle interior in comparison to a known head-up display (HUD). Therefore, for example, the same image content can be perceived by use of the virtual image by a driver and a front passenger, wherein a distortion of the virtual image is dependent on an observation position.

Described herein are further embodiments, due to which additional advantages result.

A further advantageous embodiment provides that the at least one image source additionally has an at least two-dimensionally switchable image display, which is configured to generate a virtual image assigned to the at least one image display by selectively activating pixels forming the at least one image display by way of the control device. In other words, the at least one image source furthermore has an electrically activateable planar display by use of which optical signals can be generated. In this case, this can be a display screen which can be implemented, for example, as a field emission display screen (FED), as a liquid crystal display screen (LCD), for example as a thin-film transistor display screen (TFT-LCD), a cathode ray tube display screen (CRT), as a plasma display screen, as an organic light-emitting diode display screen (OLED), or as a surface conducting electron emitter display screen (SED). Alternatively or additionally, the display screen can include an LED background light in the form of at least one mini-LED or an arrangement of at least one micro-LED. The at least one image display can output, for example, a surface (a two-dimensional object) and/or a body (a three-dimensional object). The advantage results in this way that if needed, for example, if a required information content can only be depicted incompletely by the at least one strip display, the information content can be output completely by use of the at least one image display.

A further advantageous embodiment for this purpose provides that the at least one image display overlaps the at least one strip display in the direction of the reflection region. In other words, the at least one strip display is overlapped by the at least one image display so that the at least one image display is arranged between the reflection region and the at least one strip display. Alternatively or additionally, the at least one strip display is interrupted in the region of the at least one image display and borders the at least one image display on two sides opposite to one another if the at least one strip display is arranged within an image plane formed by the at least one image display. In other words, the at least one image display and the at least one strip display are located in one plane, wherein the at least one image display is bordered on the two sides opposite to one another by the at least one interrupted strip display. Alternatively or additionally, the at least one image display and the at least one strip display are arranged without overlap in relation to one another in the direction of the reflection region. The two displays different from one another are thus arranged adjacent to one another in the direction of the reflection region, without one of the displays concealing the other of the displays, that is to say overlapping it. In this case, in the installed position of the windshield, the at least one strip display is positioned between the at least one image display and the lateral edge of the at least one pane layer including the reflection region and/or the at least one image display is positioned between the at least one strip display and the at least one pane layer including the reflection region. The two displays and the reflection region thus form a sandwich-like structure. Depending on the type of the arrangement, the at least one strip display or the at least one image display is delimited on one side by the reflection region and on the other side by the one of the displays differing therefrom. The advantage results in this way that a large number of display options can be implemented by use of a flexible arrangement of the two displays.

A further advantageous embodiment provides that the reflection region forms an optically continuous display area which is bordered laterally by at least one of the A pillars of the motor vehicle adjoining the windshield and/or is delimited by at least one digital display of a side mirror. In other words, the virtual image is displayed in a large area by use of the reflection region, wherein the optically continuous display area extends from the one A pillar on a driver side to the other of the A pillars on a front passenger side. Alternatively or additionally, the at least one digital display of the side mirror is arranged on at least one end of the optically continuous display area. The advantage results in this way that items of information can be displayed in an entire field of view of a vehicle occupant, wherein a view of the occupant can still rest on a road section to be traveled. At least one of the A pillars and/or at least one of the digital displays of the side mirror can be used as the respective lateral delimitation of the optically continuous display area. Alternatively or additionally, the view of the occupant can be guided by the display area from a center of the display area to one side of the display area by use of the virtual image if a critical situation is detected on the basis of acquired surroundings of the motor vehicle. The critical situation can be, for example, an unexpected overtaking process by a further motor vehicle which is arranged in a blind spot of the occupant.

A further advantageous embodiment provides that the control device takes into consideration a position and/or orientation of a vehicle user acquired by use of an acquisition unit, for example his head and/or eyes, and/or an acquired user preference during the activation of the at least one image source. Therefore, the vehicle user himself and alternatively or additionally the user preference input by him are acquired to activate the at least one image source in dependence thereon. For example, the acquisition unit includes a camera, for example a driver observation camera, which acquires data which describe the position and/or orientation of the head and/or the eyes of the vehicle user. Subsequently, a location of the motor vehicle user, that is to say the position in a space can be ascertained on the basis of the acquired data, wherein the space includes an interior of the motor vehicle. Alternatively or additionally, a location of the vehicle user, that is to say the orientation in the space, can be determined based on the acquired data. Alternatively or additionally, the activation of the at least one image source can be dependent on the acquired user preference. In this context, the user preference is understood as an input effectuated by the vehicle user which defines respective output parameters, for example, a display intensity, a display duration, a display color, a relative position, and/or a relative location of the virtual image in relation to the vehicle user. On the basis of the acquired vehicle user and/or the acquired user preference, the virtual image is displaced along at least one spatial axis predetermined by a vehicle direction to generate an unconcealed display with respect to the vehicle user. In other words, the virtual image is displaced along the at least one spatial axis so that the vehicle user always receives a direct and unrestricted view of the virtual image. A size difference of two vehicle users different from one another, for example, can thus be taken into consideration in the display. The advantage results in this way that the display can be adapted in dependence on the vehicle user, that is to say his physical build and/or his movement and/or his preferred display settings. Alternatively or additionally, a perspective display can be implemented and thus, for example, a three-dimensional effect can be generated.

A further advantageous embodiment provides that the at least one strip display includes at least two single strips positioned against one another. In other words, two single strips arranged adjacent to one another are provided, which form the at least one strip display. A respective longitudinal extension axis of each of the at least two single strips is arranged here in a plane oriented corresponding to the reflection region. This plane is predetermined, for example, by a specific distance of the virtual image from the observer in the vehicle longitudinal direction as a function of the reflection region. The at least two single strips are positioned within this plane in such a way that a respective axis of the respective single strip which corresponds to a respective direction of a respective greatest extension lies in the plane. In each case only one of the at least two single strips is to be activated here to generate the virtual image assigned to the at least one strip display. The virtual image can thus be changed by use of selective activation of the respective single strips, for example, to displace the virtual image in a vehicle vertical direction, wherein the specific distance of the virtual image to the occupant can be kept constant. The advantage results in this way that a position of the light strip and/or the running light can be changed particularly easily, wherein a complex display technology, for example that of a display screen, can be omitted.

A further advantageous embodiment provides that the at least one strip display is arranged on an actuator activatable by use of the control device, which is configured to change a relative position of the at least one strip display in relation to the reflection region in order to displace the virtual image. In other words, the at least one strip display can be spatially displaced by use of the actuator, wherein a relative position of the at least one strip display in relation to the reflection region is changed in dependence on a displacement of the at least one strip display. The actuator is for example a drive-technology unit, which can convert an electrical control signal of the control device into a mechanical movement. For this purpose, the actuator can be designed, for example, as a framework having a movable arm, a scissors construction, or a vertical mast. The advantage results in this way that the at least one strip display can be used particularly variably and thus a number of employed and installed LED strips can be reduced.

A further advantageous embodiment provides that the reflection region has at least one surface section which is permanently opaque and is colored black to generate the virtual image. The at least one surface section is thus always light opaque, that is to say murky, and black. The advantage results in this way that the at least one surface section can provide a high-contrast background for the virtual image at any time. Alternatively or additionally, the at least one surface section can be switchable by use of the control device from a transparent state into an at least partially opaque and partially black colored state to generate the virtual image. The at least one surface section is thus selectively activated to specify a transmissivity and/or a black coloring of the at least one surface section. For example, a corresponding profile, for example, a tint profile, can be generated. The advantage results in this way that the at least one surface section can be used for various purposes. The at least one surface section can thus be used in the at least partially opaque and partially black colored state to generate the virtual image and in the transparent state for the interference-free observation of vehicle surroundings by the occupant.

A further advantageous embodiment provides for this purpose that the at least one permanently opaque and black colored surface section includes a screen printed edge. The at least one permanently opaque and black surface section therefore includes a screen printed edge. The screen printed edge, that is to say a so-called black print, can be formed, for example, as a black pane edge which has a continuous black section and a dotted section. The screen printed edge has multiple reflection particles for this purpose. That is to say, the screen printed edge includes particles which are configured to reflect the emitted light beams of the at least one light source. The advantage results in this way that the screen printed edge can be used as a background for the virtual image and an area claimed thereby can be used to generate the virtual image. Alternatively or additionally, the at least one switchable surface section is formed by an electrochromic or thermochromic material and/or a material based on liquid crystals. In other words, the at least one switchable surface section includes the electrochromic, photochromic or thermochromic material and/or the material based on liquid crystals. These are for example materials which are configured to implement tint-capable glazing, in that a light transmissivity can be changed by applying an electrical voltage, changed light conditions, and/or as a reaction to heating. For example, tungsten trioxide or polyaniline is used as an electrochromic material, for example, vanadium dioxide is used as a thermochromic material, and the photochromic material includes, for example, halogens or nitrates. The material based on liquid crystals is, for example, an LC glass (liquid crystal) or a PDLC glass (polymer dispersed liquid crystal).

A method for operating an embodiment of a motor vehicle having a display system is described herein, wherein the motor vehicle includes a windshield having at least one pane layer, at least one image source, a reflection region, and a control device. The control device has a processor unit which includes at least one microprocessor, at least one microcontroller, at least one FPGA (Field Programmable Gate Array), and/or at least one DSP (Digital Signal Processor). Furthermore, the processor unit can have program code which can be stored in a data memory of the processor unit and is configured, upon execution by the processor unit, to carry out the embodiment of the method described herein. The at least one image source is positioned in a dashboard of the motor vehicle and provides at least one exclusively one-dimensionally switchable strip display, wherein the at least one strip display is positioned in the dashboard in parallel to a lateral edge predetermined by a radius of curvature of the at least one pane layer and/or at least one component separate from the at least one pane layer. Furthermore, the reflection region extends in parallel to a lateral edge of the at least one pane layer and is arranged on the dashboard in an installed position of the windshield in the motor vehicle, wherein the reflection region is provided along at least one lateral region of the at least one pane layer on at least one pane surface and/or along the at least one component on a windshield frame. The method described herein is characterized by an acquisition of a setting process and/or a performed setting of a control parameter and/or a remaining ratio of the storage capacity to a total storage capacity. Subsequently, light beams are emitted by use of the at least one light source in dependence on the acquisition, wherein the at least one image source is activated by use of the control device and the emitted light beams are reflected by use of the reflection region to generate a virtual image. A dynamic running light for generating an animation effect and/or a static light strip for displaying the setting process and/or the performed setting of the control parameter and/or the remaining ratio of the storage capacity to a total capacity is provided as the virtual image.

Also described herein are refinements of the method described herein which have features as have already been described in conjunction with the refinements of the motor vehicle described herein. For this reason, the corresponding refinements of the method described herein are not described once again here.

The motor vehicle described herein is for example designed as an automobile, for example as a passenger vehicle or truck, or as a passenger bus or motorcycle.

The disclosure also includes the combinations of the features of the described embodiments.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
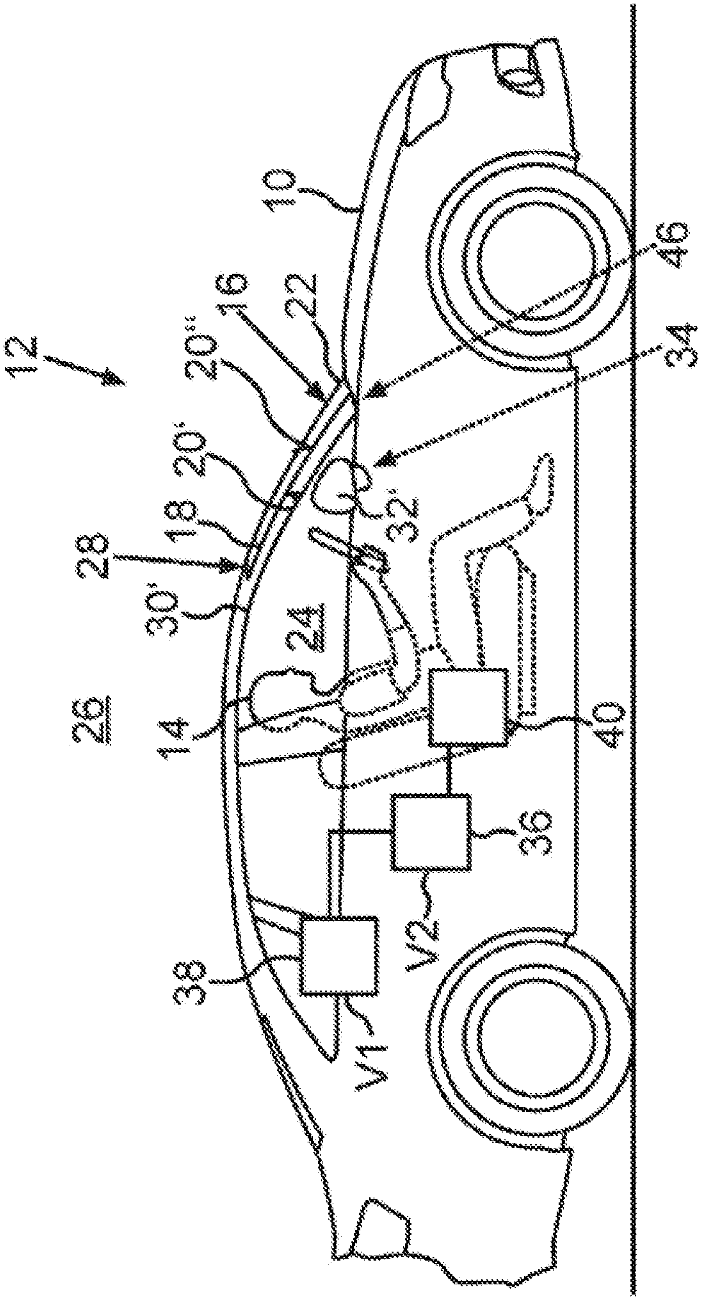
FIG. 1 is a schematic illustration of a motor vehicle having a display system in a side view.

Reference will now be made in detail to example embodiments which are illustrated in the accompanying drawings, wherein like reference numerals refer to like elements throughout.

The example embodiments explained hereinafter are example embodiments. In the example embodiments, the described components of the embodiments each represent individual features to be considered independently of one another, which each also refine the disclosure independently of one another. The disclosure is therefore also to include combinations of the features of the embodiments other than those shown. Furthermore, the described embodiments can also be supplemented by further features already described.

In the drawings, identical reference signs each identify functionally identical elements.

FIG. 1 shows a schematic illustration of a motor vehicle 10 having a display system 12 in a side view, wherein the motor vehicle 10 can be controlled by a vehicle user 14, for example, a driver seated in a driver seat. Furthermore, the motor vehicle 10 can include a windshield 16, which can have a pane layer 18. For example, the windshield 16 can be formed as a composite glass pane and can have multiple respective pane layers 18 arranged one on top of another. The pane layer 18 can be delimited by two pane surfaces 20', 20" and one lateral edge 22, for example four lateral edges 22. For this purpose, one pane surface 20' can face toward an interior 24 of the motor vehicle 10 and another pane surface 20" can face toward surroundings 26 of the motor vehicle 10. In an installed position of the windshield 16, the lateral edge 22 can be arranged via a windshield frame 28 on the motor vehicle 10, for example between two A pillars 30', 30" and respective side mirrors 32', 32" or on a dashboard 34, wherein only the A pillar 30' visible in the illustration and the side mirror 32" are provided with a respective reference sign in FIG. 1.

Furthermore, the motor vehicle 10 shown in FIG. 1—shown in simplified form as a box in each case—can have a control device 36, an acquisition unit 38, and an image source 40. The control device 36 can activate the image source 40 as a function of data acquired by the acquisition unit 38. The acquisition unit 38 may be, for example, a driver observation camera, and acquire a head and eyes of the vehicle user 14, on the basis of which a position and an orientation of the vehicle user 14 can be ascertained by the control device 36. Furthermore, the acquisition unit 38 can for example be designed as a user interface 47, shown, for example, in FIG. 4 and FIG. 5, to be able to acquire a user preference, that is to say an input of the vehicle user 14. The image source 40 is described in detail hereinafter in conjunction with FIG. 2 and FIG. 3.

Figure 2:
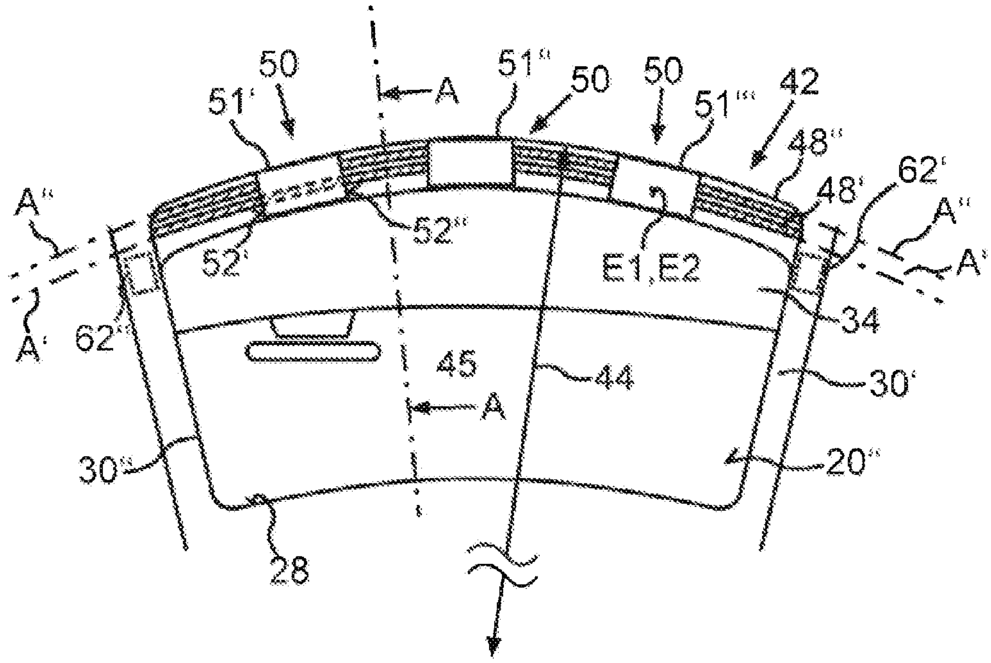
FIG. 2 is a schematic illustration of a detail of the motor vehicle having the display system in a top view.
Figure 3:
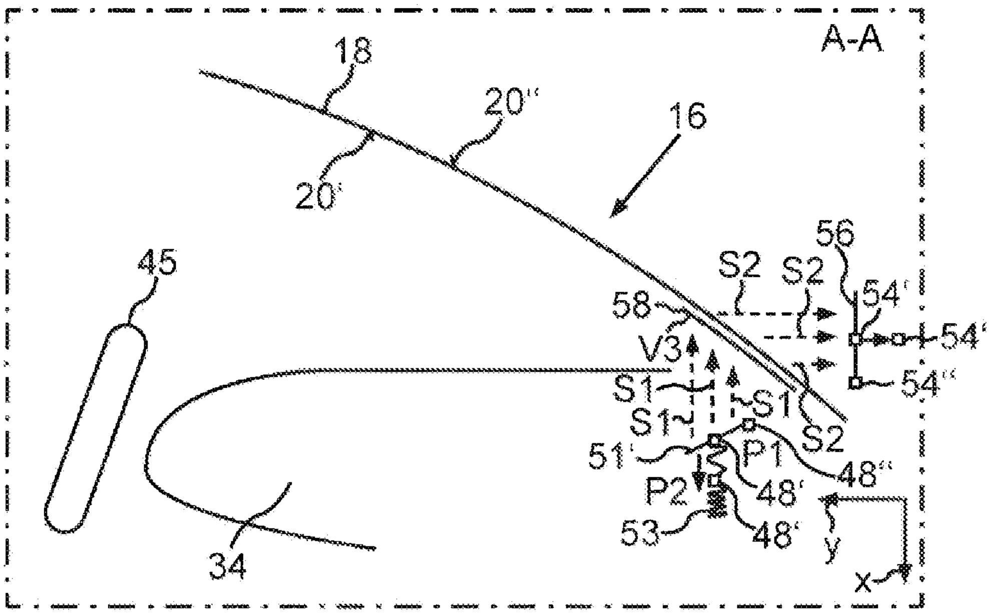
FIG. 3 is a schematic sectional illustration of the detail of the motor vehicle having the display system.

The motor vehicle 10 having the display system 12 is described further in FIG. 2 and FIG. 3. In this case, FIG. 2 shows a schematic illustration of a detail of the motor vehicle 10 having the display system 12 in a top view and FIG. 3 shows a corresponding sectional illustration A-A having respective components which have already been described in conjunction with FIG. 1. FIG. 2 thus shows the pane surface 20" of the windshield 16 facing toward the surroundings 26, which adjoin the two A pillars 30', 30" and an upper side of the dashboard 34, wherein a steering wheel 45 is arranged on the dashboard 34.

A possible embodiment of the image source 40 is shown by way of example in FIG. 2 and FIG. 3. In this case, the image source 40 can include, for example, multiple electrical illuminants, respective displays 42, 50 which are configured to emit light beams S1, which are shown as arrows in FIG. 3. The image source 40 can have an exclusively one-dimensionally switchable strip display 42, which is in parallel in the dashboard 34 to the lateral edge 22 predetermined by a radius of curvature 44 and alternatively to a component 46 separate from the pane layer 18 predetermined by a radius of curvature 44. For example, the strip display 42 can include a single strip 48', 48" formed as an LED strip. In this case—as shown for the single strip 48"—the strip display 42 can be arranged fixed in position in the dashboard 34. It is also possible that the single strip 48" of the strip display 42 is arranged on an actuator 53 activatable by use of the control device 36, by use of which a relative position P1, P2 of the strip display 42 can be changed, as indicated by an arrow. For the sake of clarity, the arrow indicates only one possible movement direction of the actuator 53.

The image source 40 shown in FIG. 2 and FIG. 3 can additionally have a two-dimensionally switchable image display 50, wherein in the example three single image displays 51', 51", 51'" are shown as display screens. A relative arrangement of the image display 50 and the strip display 42 can be designed variably. The strip display 42 including the single strip 48" can be interrupted in the region of the image display 50, as shown for the single image display 51', and can adjoin the image display 50 on two opposing sides 52', 52", if the strip display 42 is arranged within a display plane E1 formed by the image display 50. The image display 50, as shown for the single image display 51', can also overlap the strip display 42 including the single strip 48' in the direction of the windshield 16. This would be the case if a position-variable arrangement by use of the actuator 53 were omitted and the single strip were arranged permanently at the relative position P1. In this case, the two single strips 48', 48" of the strip display 42 would be positioned against one another, wherein a respective longitudinal extension axis A', A" of each of the single strips 48', 48" is arranged in a common plane E2, wherein in each case only one of the two single strips 48', 48" is to be activated by use of the control device 36. In FIG. 3, for example, the display plane E1 and the plane E2 are congruent. Furthermore, it can be possible to arrange the image display 50 and the strip display 42 free of overlap in relation to one another, so that in the installed position of the windshield 16, the strip display 42 is positioned between the image display 50 and the lateral edge 22 of the pane layer 18, or the image display 50 is positioned between the strip display 42 and the lateral edge 22 of the pane layer 18, wherein an illustration of such an arrangement was omitted for the sake of clarity.

It is furthermore shown in FIG. 3 how the light beams S1 emitted by the image source 40 are to be reflected at a reflection region 58 as reflected light beams S2 to generate a virtual image 54', 54". The virtual image 54' corresponds here to the single strip 48' of the strip display 42 in the respective relative position P1, P2 and the virtual image 54" to the single strip 48" of the strip display 42. The virtual image 56 associated with the image display 50 is generated by selective activation of pixels forming the image display 50 by the control device 36. The reflection region 58 can extend in parallel to a lateral edge 22 of the pane layer 18, wherein the reflection region 58 is provided along a lateral region 61 of the pane layer 18 at one of the pane surfaces 20', 20". Alternatively or additionally, the reflection region 58 can be provided along the component 46 separate from the pane layer 18 on the windshield frame 28, wherein an illustration has been omitted for the sake of clarity. The reflection region 58 forms an optically continuous display surface 60, which is shown in detail in FIG. 4 and FIG. 5, and which is laterally bordered by the A pillars 30', 30" of the motor vehicle 10 and can be delimited by a digital display 62', 62" of the side mirror 32', 32", wherein the digital display 62', 62" is schematically indicated as overlapped by the respective A pillar 30', 30" in FIG. 2.

The image source 40 can be activated by use of the control device 36. As a function of the data acquired by the acquisition unit 38, the virtual image 54', 54" of the strip display 42 and/or the virtual image 56 of the image display 50 can be displaced along a vertical axis denoted as the x axis and along a transverse axis identified as the y axis of the motor vehicle 10 in order to generate an unconcealed display with respect to the vehicle user 14. Only one of the two single strips 48', 48" can also be activated in each case to generate the virtual image 54', 54" associated with the strip display 42. Furthermore, the relative position P1, P2 of the single strip 48' of the strip display 42 in relation to the reflection region 58 can be changed to displace the virtual image 54'.

Figure 4:
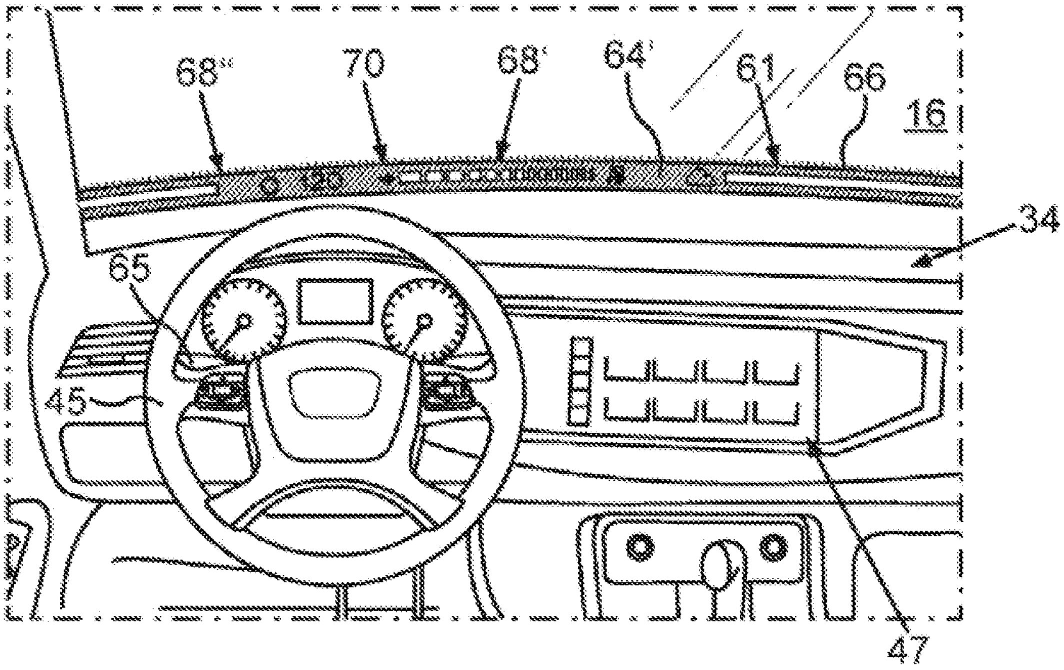
FIG. 4 is a schematic perspective illustration of an interior of the motor vehicle having the display system in an embodiment, wherein a viewing direction through a windshield corresponds to a forward movement direction of the motor vehicle.
Figure 5:
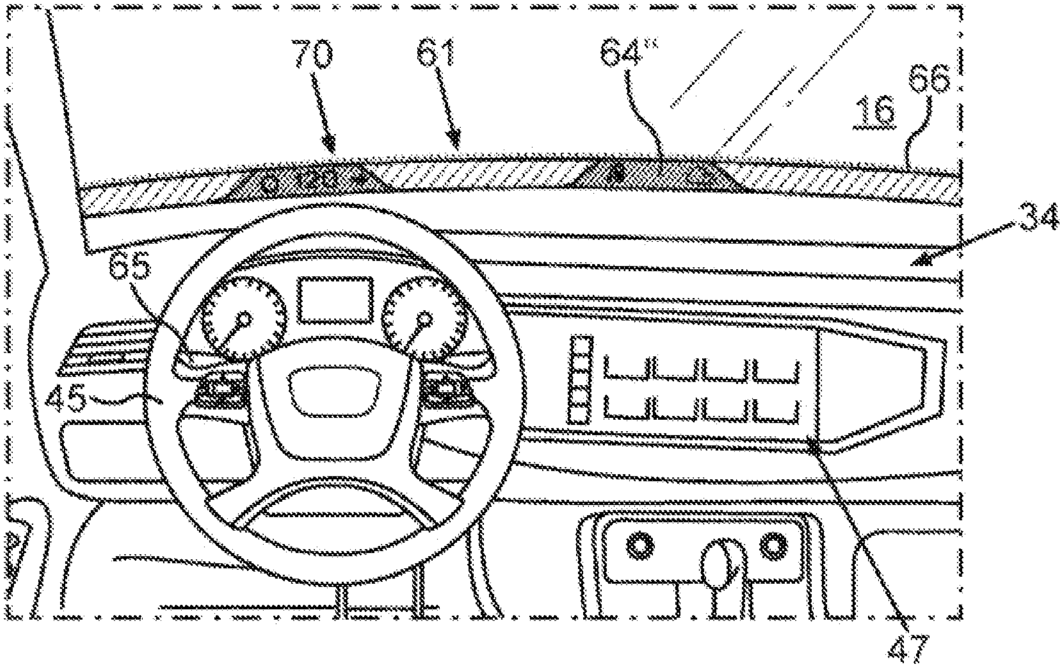
FIG. 5 is a schematic perspective illustration similar to FIG. 4 for a further embodiment of the motor vehicle having the display system.

FIG. 4 and FIG. 5 each show a different embodiment of the reflection region 58 and the virtual image 54', 54", 56' having respective components which were already described in conjunction with FIG. 1, FIG. 2, and FIG. 3. The perspective illustrations shown show the interior 24 of the motor vehicle 10 having the display system 12 in two embodiments, wherein a viewing direction through a windshield 16 corresponds to a forward movement direction of the motor vehicle 10. The reflection region 58 can have two surface sections 64', 64". For this purpose, the surface section 64' can be permanently opaque and colored black and the surface section 64" can be switched by use of the control device 36 from a transparent state into at least one partially opaque and partially black colored state to generate the virtual image 54', 54", 56. The one surface section 64' which is formed permanently opaque and colored black can—as shown in FIG. 4—include a screen printed edge 66 which has multiple reflection particles. FIG. 5 shows the switchable surface section 64", which is formed, for example, from a material based on liquid crystals. A tint or a color profile can thus be implemented, for example, by use of the switchable surface section 64".

In FIG. 4, the display surface 60 can be displayed as the virtual image 54', 54", 56 of the strip display 42 to indicate a performed setting of a control parameter, for example, an actuation of a turn signal 65. A dynamic running light 68' can display an animation effect to indicate a selected travel direction and a static light strip 68" can indicate a travel direction deviating from the selected travel direction. In addition, an arrow symbol 70 indicating the selected travel direction can be displayed by use of the image display 50. Furthermore, a remaining ratio of a storage capacity to a total storage capacity, for example as an available fuel supply, or a setting process, for example the increase of a current velocity to a maximum permissible velocity can be displayed. A redundant display by use of an instrument cluster can be omitted here or an attentiveness of the vehicle user 14 can be deliberately controlled on the basis of the redundant display.

To generate the virtual image 54', 54", 56, in a first operation V1, the setting process, the performed setting of the control parameter, and a storage ratio are acquired, wherein by use of this these can be provided as data by the acquisition unit 38 to the control device 36. Subsequently, in a second operation V2, the light beams S1 can be emitted as a function of the acquisition, that is to say based on the acquired data, by use of the image source 40, wherein the image source 40 is activated for this purpose by the control device 36. The emitted light beams S1 are reflected in a third operation V3 by use of the reflection region 58 and generate the virtual image 54', 54", 56 as reflected light beams S2, for example as the dynamic running light 68' and as the static light strip 68".

One or more aspects of the disclosure are based on the finding that an application of a black print, that is to say a black region formed by the screen printed edge 66, normally remains unused. This can be used here for an at least two-dimensional display as an optically continuous appearing display surface 60. For example, symbols, which describe a warning message or infotainment content, of an instrument cluster or a virtual assistant can thus be depicted. A three-dimensional impression of the display can optionally be achieved by using a dynamic perspective, which continuously acquires the head or the eyes of the vehicle user 14 (head or eye tracking) and adapts a perspective of the virtual image 54', 54", 56. Warning symbols can thus be overlaid dynamically in a viewing direction of the driver (vehicle user 14). Furthermore, visual display contents in the instrument cluster can also be reduced and items of information can be displayed in the field of view of the driver (vehicle user 14) in front of the unmoving and monochromatic background (reflection region 58). The image source 40 can for example reflect in the black region at a pane root (lateral edge 22 of the windshield 16), wherein the image source 40 can have the strip display 42 and the image displays 50. A particularly high contrast value can thus be implemented in the display so that the impression results that the black region itself is the strip display 42 or the image display 50.

Overall, the examples show how a pillar-to-pillar display can be provided by reflection in the black region (reflection region 58) of the pane (windshield 16).

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in *Superguide* v. *DIRECTV*, 358 F3d 870, 69 USPQ2d 1865 (Fed. Cir. 2004). That is the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C. In addition, the term "and/or" includes a plurality of combinations of relevant items or any one item among a plurality of relevant items. That is, the scope of the expression or phrase "A and/or B" includes all of the following: (1) the item "A", (2) the item "B", and (3) the combination of items "A and B".

The invention claimed is:

1. A motor vehicle, comprising:
- a dashboard;
- a display system, including:
  - a windshield including a pane layer,
  - an image source in the dashboard,
  - a reflection region which extends in parallel to a lateral edge of the pane layer such that, in an installed position of the windshield, the lateral edge is on the dashboard and the reflection region is configured to reflect light beams to generate a virtual image, wherein
    - the reflection region is along at least one of:
      - a lateral region of the pane layer on a pane surface, and
      - a component separate from the pane layer on a frame of the windshield, and
    - the image source includes a one-dimensional switchable strip display configured to emit light beams, the one-dimensional switchable strip display being in the dashboard in parallel to the lateral edge predetermined by a radius of curvature of at least one of the pane layer and of the component, and a two-dimensional switchable image display arranged without overlap in relation to the one-dimensional switchable strip display and being in the dashboard in parallel to the lateral edge predetermined by the radius of curvature of the at least one of the pane layer and of the component, and a controller configured to:

control the one-dimensional switchable strip display to emit the light beams to be reflected at the reflection region by output of a dynamic running light configured to generate an animation effect by respective light sources of the one-dimensional switchable strip display being activated in at least one direction to generate an impression that the virtual image moves in the at least one direction, and a static light strip configured to display at least one information item among information items of:

a setting process, a performed setting of a control parameter, and a remaining ratio of a storage capacity to a total storage capacity.

2. The motor vehicle as claimed in claim 1, wherein the two-dimensional switchable image display is configured to generate a virtual image of the two-dimensional switchable image display by selective activation of pixels forming the two-dimensional switchable image display using the controller.

3. The motor vehicle as claimed in claim 2, wherein with the one-dimensional switchable strip display within a display plane including the two-dimensional switchable image display, the one-dimensional switchable strip display is interrupted and does not overlap the two-dimensional switchable image display in a region of the two-dimensional switchable image display and adjoins the two-dimensional switchable image display on two sides opposite to one another, or the two-dimensional switchable image display and the one-dimensional switchable strip display do not overlap one another in a direction of the reflection region such that, in the installed position of the windshield, the one-dimensional switchable strip display is positioned between the two-dimensional switchable image display and the lateral edge or the two-dimensional switchable image display is positioned between the one-dimensional switchable strip display and the lateral edge.

4. The motor vehicle as claimed in claim 1, further comprising:

an A-pillar adjoining the windshield; and a side mirror including a digital display, wherein the reflection region forms an optically continuous display surface, which is laterally bordered by the A-pillar and/or is delimited by the digital display of the side mirror.

5. The motor vehicle as claimed in claim 1, wherein the controller is configured to activate the image source based on at least one of a position of a vehicle user and an orientation of a vehicle user, and the virtual image is displaced along a vertical axis and/or a transverse axis of the motor vehicle to generate an unconcealed display with reference to the vehicle user.

6. The motor vehicle as claimed in claim 5, wherein the position and/or the orientation is obtained by an acquisition unit configured to obtain information about a head and/or eyes of the vehicle user, and/or an input user preference.

7. The motor vehicle as claimed in claim 1, wherein the one-dimensional switchable strip display includes at least two single strips positioned against one another, a respective longitudinal extension axis of each of the at least two single strips is disposed in a plane oriented corresponding to the reflection region, and only one of the at least two single strips is to be activated to generate the virtual image associated with the one-dimensional switchable strip display.

8. The motor vehicle as claimed in claim 1, wherein the one-dimensional switchable strip display is disposed on an actuator activatable by the controller, the actuator being configured to change a relative position of the one-dimensional switchable strip display in relation to the reflection region to displace the virtual image.

9. The motor vehicle as claimed in claim 1, wherein the reflection region includes a surface section which is permanently opaque and colored black and/or is switchable by the controller from a transparent state into a partially opaque and partially black colored state to generate the virtual image.

10. The motor vehicle as claimed in claim 9, wherein the surface section is permanently opaque and black colored and the surface section includes a screen printed edge including a plurality reflection particles, or the surface section is switchable by the controller and includes at least one of an electrochromic material, a thermochromic material, and a material based on liquid crystals.

11. A method of operating a motor vehicle according to claim 1 comprising:

acquiring at least one information item among information items of a setting process, a performed setting of a control parameter, and a remaining ratio of a storage capacity to a total storage capacity;

activating, by the controller, the image source to emit light beams by the one-dimensional switchable strip display; and reflecting the emitted light beams at the reflection region to such that the reflected light beams generate the virtual image by output of a dynamic running light that generates an animation effect by respective light sources of the one-dimensional switchable strip display being activated in at least one direction to generate an impression that the virtual image moves in the at least one direction, and based on the acquiring, a static light strip configured to display the acquired at least one information item among the acquired information items of:

the setting process, the performed setting of the control parameter, and the remaining ratio of the storage capacity to the total storage capacity.

12. The method of claim 11, further comprising generating a virtual image of the two-dimensional switchable image display by selectively activating pixels forming the two-dimensional switchable image display.

13. The method of claim 12, wherein with the one-dimensional switchable strip display within a display plane including the two-dimensional switchable image display, the one-dimensional switchable strip display is interrupted and does not overlap the two-dimensional switchable image display in a region of the two-dimensional switchable image display and adjoins the two-dimensional switchable image display on two sides opposite to one another, or the two-dimensional switchable image display and the one-dimensional switchable strip display are disposed without overlap in relation to one another in a direction of the reflection region such that, in the installed position of the windshield, the one-dimensional switchable strip display is positioned between the two-dimensional switchable image display and the lateral edge or the two-dimensional switchable image display is positioned between the one-dimensional switchable strip display and the lateral edge.

14. The method of claim 11, wherein wherein the reflection region forms an optically continuous display surface, which is laterally bordered by an A pillar of the motor vehicle and/or is delimited by a digital display of a side mirror of the motor vehicle.

15. The method of claim 11, further comprising:

activating the image source based on at least one of a position and an orientation of a vehicle user, and displacing the virtual image along a vertical axis and/or a transverse axis of the motor vehicle to generate an unconcealed display with reference to the vehicle user.

16. The method of claim 15, further comprising:

acquiring information about a head and/or eyes of a vehicle user to obtain the position and/or the orientation of the vehicle user; and/or acquiring an input user preference to obtain the at least one of the position and the orientation of the vehicle user.

17. The method of claim 11, wherein the one-dimensional switchable strip display includes at least two single strips positioned against one another, and a respective longitudinal extension axis of each of the at least two single strips is disposed in a plane oriented corresponding to the reflection region, wherein the method further comprises activating only one of the at least two single strips to generate the virtual image associated with the one-dimensional switchable strip display.

18. The method of claim 11, further comprising:

activating an actuator to change a relative position of the one-dimensional switchable strip display in relation to the reflection region to displace the virtual image, wherein the one-dimensional switchable strip display is disposed on the actuator.

19. The method of claim 11, wherein the reflection region includes a surface section which is permanently opaque and colored black and/or is switchable by the controller from a transparent state into a partially opaque and partially black colored state to generate the virtual image.

20. The method of claim 19, wherein when the surface section is permanently opaque and black colored the surface section includes a screen printed edge, and the screen printed edge includes a plurality reflection particles, and when the surface section is switchable by the controller, the surface section is formed by at least one of an electrochromic material, a thermochromic material, and a material based on liquid crystals.

* * * * *